(12) United States Patent
Magee et al.

(10) Patent No.: US 9,995,170 B2
(45) Date of Patent: Jun. 12, 2018

(54) SYSTEM AND METHOD FOR HEATING COMPONENTS OF A HEAT RECOVERY STEAM GENERATOR

(71) Applicant: GENERAL ELECTRIC TECHNOLOGY GMBH, Baden (CH)

(72) Inventors: Jeffrey Fred Magee, Longmeadow, MA (US); Donald William Bairley, Farmington, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 126 days.

(21) Appl. No.: 15/071,400

(22) Filed: Mar. 16, 2016

(65) Prior Publication Data

US 2017/0268379 A1     Sep. 21, 2017

(51) Int. Cl.
```
F01D 25/10    (2006.01)
F02C 6/04     (2006.01)
F01K 23/10    (2006.01)
F01K 13/02    (2006.01)
F01K 23/06    (2006.01)
F02C 6/18     (2006.01)
```

(52) U.S. Cl.
CPC .............. *F01D 25/10* (2013.01); *F01K 13/02* (2013.01); *F01K 23/06* (2013.01); *F01K 23/10* (2013.01); *F02C 6/04* (2013.01); *F02C 6/18* (2013.01); *Y02E 20/16* (2013.01)

(58) Field of Classification Search
CPC .... F01D 25/10; F02C 6/18; F02C 6/04; F01K 23/06; F01K 13/02; F01K 23/10; Y02E 20/16

USPC ..................... 60/39.182, 646, 657
See application file for complete search history.

(56) References Cited

U.S. PATENT DOCUMENTS

| | | | |
|---|---|---|---|
| 5,722,354 A | | 3/1998 | Sansoucy |
| RE36,524 E | * | 1/2000 | Tomlinson ............ F01K 23/106 122/7 R |
| 6,125,623 A | * | 10/2000 | Cloyd ................... F01K 21/047 60/39.182 |
| 7,032,373 B2 | * | 4/2006 | Franke .................. F01K 23/106 60/39.182 |
| 2012/0102962 A1 | * | 5/2012 | Sivasankaran .......... F01K 23/10 60/772 |

(Continued)

*Primary Examiner* — Hoang Nguyen
(74) *Attorney, Agent, or Firm* — GE Global Patent Operation; Stephen G. Midgley

(57) ABSTRACT

A system for heating one or more components of a heat recovery steam generator that includes a heat-transferring conduit that fluidly connects a high-pressure section of a flow path to a low-pressure section of the flow path. The flow path is defined by a housing of the heat recovery steam generator and configured to direct a heat-containing medium. The heat-transferring conduit is configured to receive the heat-containing medium from the flow path such that the heat-containing medium flows through the heat-transferring conduit via a pressure differential between a first pressure of the heat-containing medium at the high-pressure section and a second pressure of the heat-containing medium at the low-pressure section. The heat-transferring conduit is further configured to heat the one or more components of the heat recovery steam generator via directing the heat-containing medium to be in heating contact with the one or more components.

20 Claims, 3 Drawing Sheets

(56) References Cited

U.S. PATENT DOCUMENTS

2012/0260668 A1* 10/2012 Rogers ................... F01K 13/02
60/786
2013/0180228 A1 7/2013 Zhang

* cited by examiner

SYSTEM AND METHOD FOR HEATING COMPONENTS OF A HEAT RECOVERY STEAM GENERATOR

BACKGROUND

Technical Field

Embodiments of the invention relate generally to power plant technology and, more specifically, to a system and method for heating one or more components of a heat recovery steam generator.

Discussion of Art

Heat recovery steam generators ("HRSGs") are devices that recover thermal energy from heat-containing mediums such as flue gas produced via combustion of a fuel, and/or any other liquid, gas, and/or plasma that contains recoverable thermal-energy. Many HRSGs recover heat from a heat-containing medium by exposing one or more components to the heat-containing medium. In such HRSGs, the evaporator generates steam by absorbing/recovering some of the thermal energy from the heat-containing medium. The super heater then heats the generated steam by absorbing/recovering more of the thermal energy from the heat-containing medium. The heated steam is then typically distributed to a steam consuming device and/or process, e.g., a steam powered turbine for generating electrical power. A similar process applies to supercritical heat recovery devices noting the distinction in working fluid properties.

Many power plants, known as combined cycle power generation plants, often use HRSGs to recover thermal energy from a flue gas produced by a primary generator such as a gas-powered turbine. The recovered thermal energy is then used to power a secondary generator.

In such power plants, however, it is possible that pressurize parts of the HRSG, and in particular the evaporator, steam drum, and the super heater, experience thermal stresses during plant start up due to temperature differences between the pressurize parts and the temperatures and pressures of the produced steam. Such thermal stresses can potentially degrade the service lives of the pressurize parts—especially pressurize parts having thick walls, dissimilar metal welds, austenitic grade metallurgy, and/or any combination of these therein. As combined cycle efficiencies continue to increase, the presence of thick walled components, dissimilar metal welds and austenitic metallurgy becomes increasingly requisite.

Notwithstanding these mechanical design considerations, e.g., thick wall components, dissimilar metal welds, and/or austenitic grade metallurgy, it is often necessary to minimize the combined cycle start up time. Pressure parts with thick walls, dissimilar metal welds, and/or austenitic grade metallurgy, however, require a longer start up time to mitigate damage that could result from thermal stresses. As can be appreciated, faster start up times are at odds with equipment lifetime. Thus, many power plants preheat pressurize parts.

Electrical heat tracing and auxiliary steam preheating are two common preheating practices. For electrical heat tracing, a heating wire element is wrapped around a pressure part component, and in particular, component areas at risk of significant thermal stress borne from the start up gradients mentioned above. Components are preheated from the outside inward to reduce the through wall stresses that occur during the start up events mentioned. One principal benefit of electrical heat tracing is the heat input is well quantified and a design can be made to cater to the given start up sequence. In practice, however, this design approach is cost prohibitive due to hardware and operation reasons. Namely, the heating element is very costly—particularly if large quantities are required. Secondly, the power consumption is similarly non-trivial due to the amount of heat input required.

With an auxiliary steam source, steam is admitted from an external source to the subject pressure part; hence heat is provided from the inside outward to reduce the through wall stresses that occur during the previously mentioned start up events. For instance, high pressure evaporators commonly utilize an auxiliary steam source to keep the pressure part warm which allows for faster steam production. A drawback of such a device is the capital equipment of this additional item as well as the operating costs, e.g., fuel and maintenance cost to run the auxiliary boiler.

In view of the above, what is needed is an improved system and method for preheating one or more components of an HRSG.

BRIEF DESCRIPTION

In an embodiment, a system for heating one or more components of a heat recovery steam generator is provided. The system includes a heat-transferring conduit that fluidly connects a high-pressure section of a flow path to a low-pressure section of the flow path. The flow path is defined by a housing of the heat recovery steam generator and configured to direct a heat-containing medium. The heat-transferring conduit is configured to receive the heat-containing medium from the flow path such that the heat-containing medium flows through the heat-transferring conduit via a pressure differential between a first pressure of the heat-containing medium at the high-pressure section and a second pressure of the heat-containing medium at the low-pressure section. The heat-transferring conduit is further configured to heat the one or more components of the heat recovery steam generator via directing the heat-containing medium to be in heating contact with the one or more components.

In another embodiment, a method for heating one or more components of a heat recovery steam generator is provided. The method includes directing a heat-containing medium via a flow path defined by a housing of the heat recovery steam generator. The flow path includes a high-pressure section and a low-pressure section. The method further includes receiving the heat-containing medium via a heat-transferring conduit fluidly connected to the high-pressure section and the low-pressure section. The method further includes heating the one or more components of the heat recovery steam generator by directing, via the heat-transferring conduit, the heat-containing medium to be in heating contact with the one or more components. The heat-containing medium flows through the heat-transferring conduit based at least in part on a pressure differential between a first pressure of the heat-containing medium at the high-pressure section and a second pressure of the heat-containing medium at the low-pressure section.

In yet another embodiment, a heat recovery steam generator for recovering heat from a flue gas produced by a combustion chamber is provided. The heat recovery steam generator includes one or more pressurized parts, a flow path, and a heat-transferring conduit. The one or more pressurize parts define a working conduit configured to contain a working medium. The flow path is defined by a housing of the heat recovery steam generator, includes a high-pressure section and a low-pressure section, and is configured to direct the flue gas. The heat-transferring conduit fluidly connects the high-pressure section to the low-pressure section and is configured to receive the flue gas from the flow path such that the flue gas flows through the heat-transferring conduit based at least in part on a pressure differential between a first pressure of the flue gas at the high-pressure section and a second pressure of the flue gas at the low-pressure section. The heat-transferring conduit is further configured to direct the flue gas to heat the one or more pressurized parts.

DRAWINGS

The present invention will be better understood from reading the following description of non-limiting embodiments, with reference to the attached drawings, wherein below:

Figure 1:
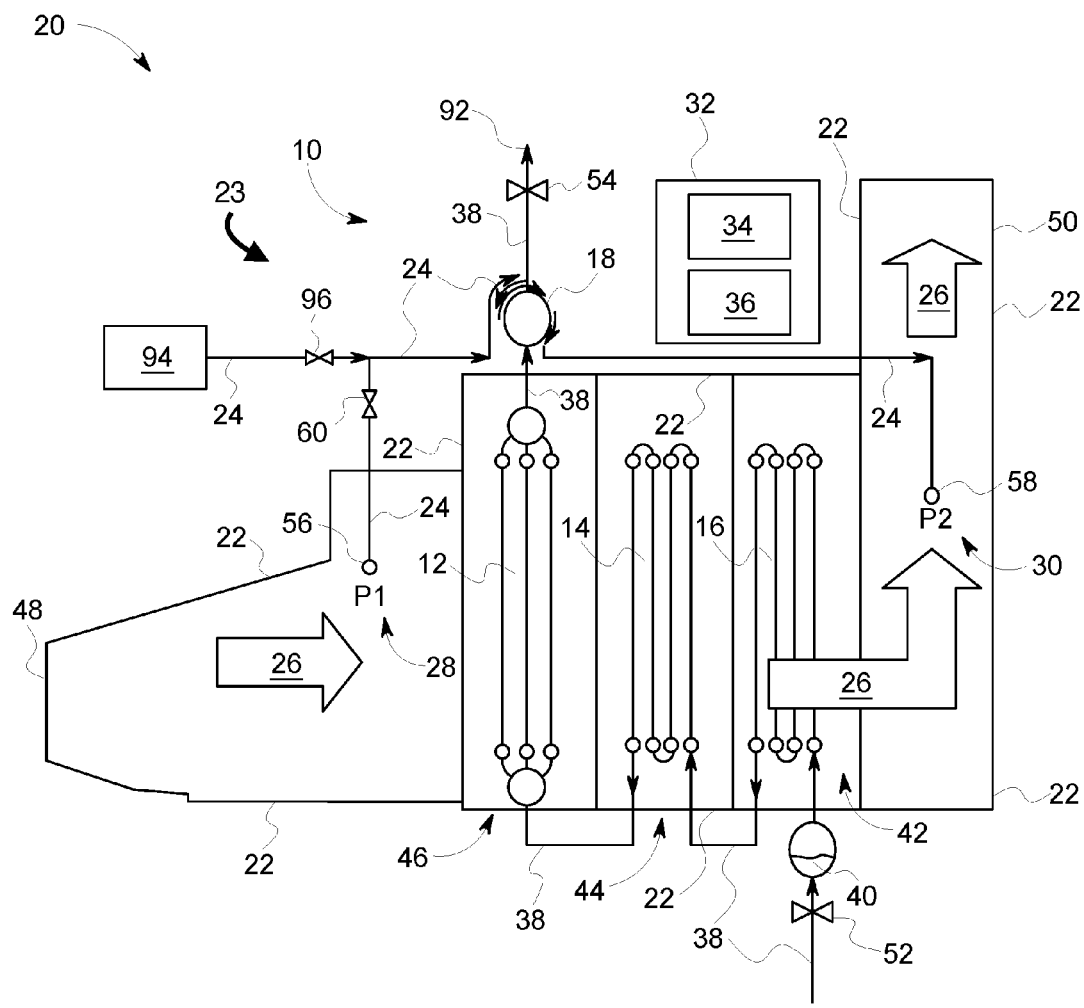
FIG. 1 is a diagram of a system for heating one or more components of a heat recovery steam generator including a flow path and a heat-transferring conduit in accordance with an embodiment of the invention.
Figure 3:
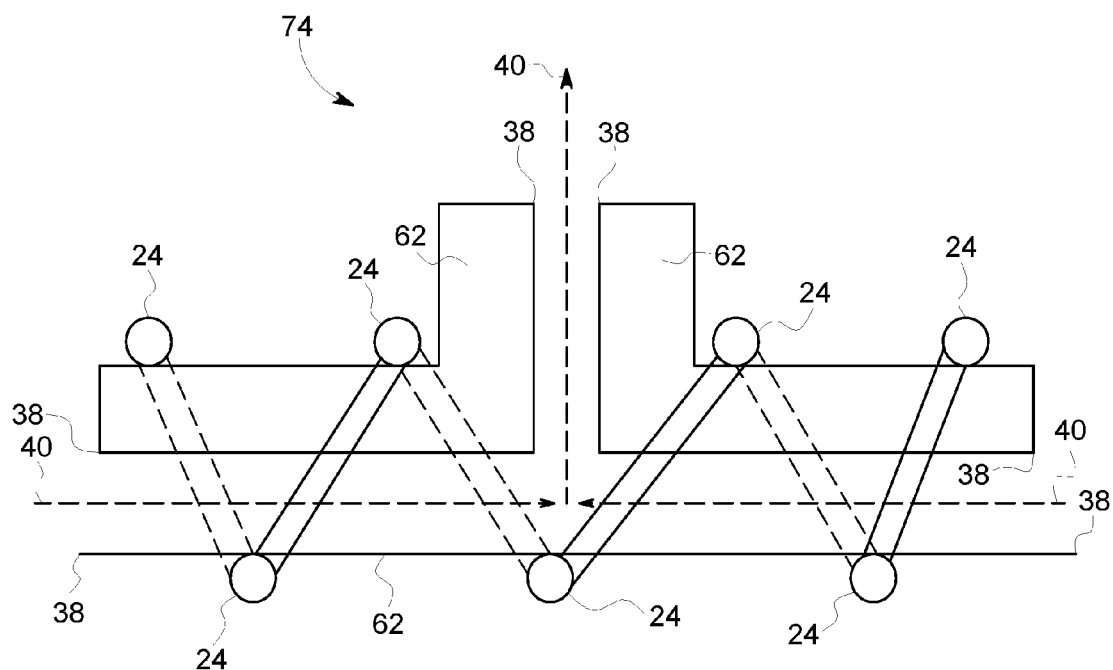
Figure 4:
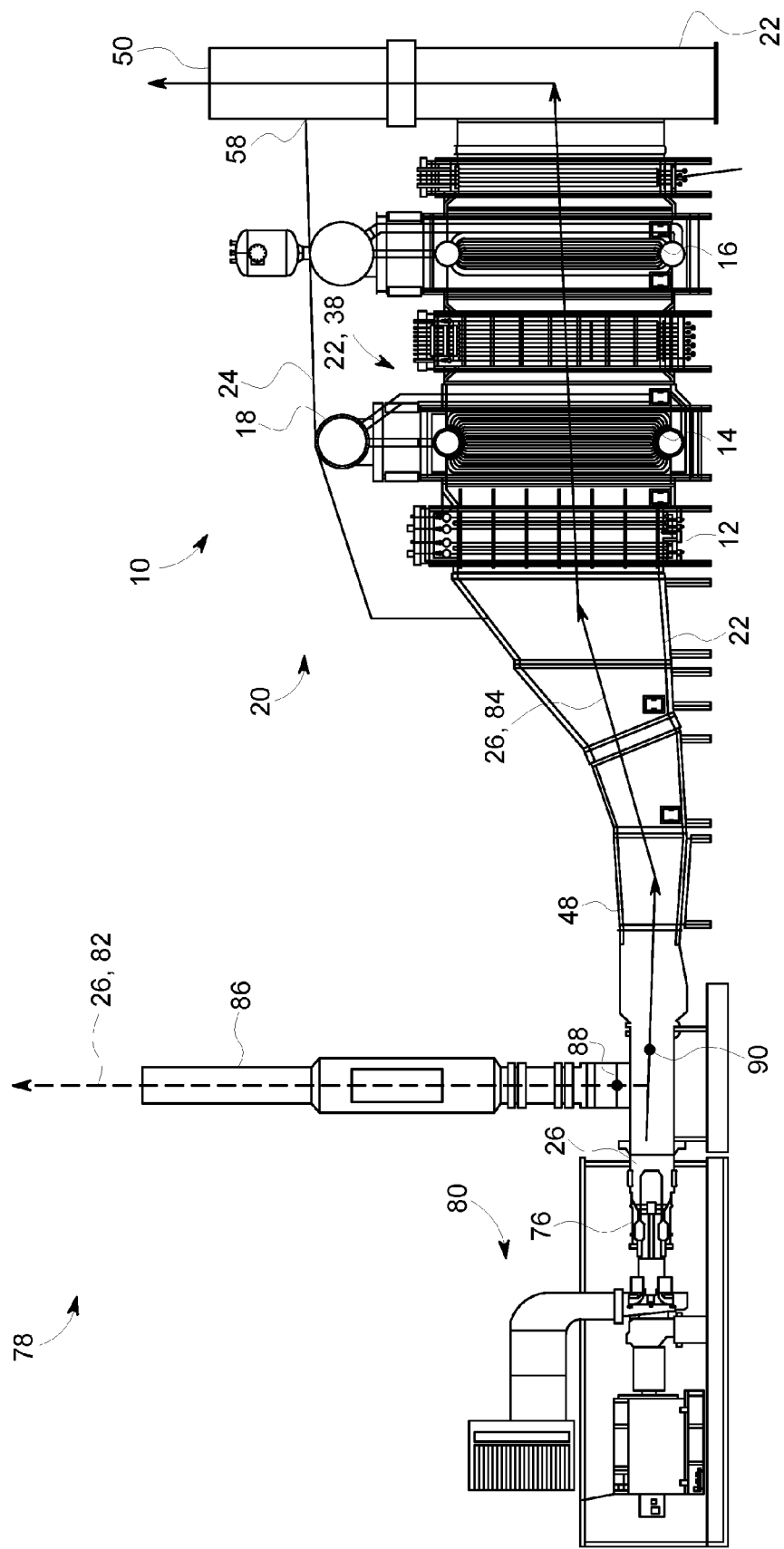

FIG. 3 is another cross-sectional diagram of the heat-transferring conduit and a component of the one or more components of FIG. 1; and FIG. 4 is another diagram of the system for heating the one or more components of the heat recovery steam generator of FIG. 1, wherein the heat recovery steam generator is a secondary generator of a combined cycle power generation plant in accordance with an embodiment of the invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "downstream," as used herein, describe the position of the referenced elements with respect to a flow path of a fluid flowing between and/or near the referenced elements. Additionally, as used herein, the term "fill" includes both fully and partially filling a containing object with a filling object. As also used herein, the term "heating contact" means that the referenced objects are in proximity of one another such that heat/thermal energy can transfer between them. As used herein, the term "working medium" means any medium, such as water, that is capable of absorbing and storing thermal energy.

Further, while the embodiments disclosed herein are described with respect to heat recovery steam generators ("HRSGs"), it is to be understood that embodiments of the present invention are equally applicable to any device and/or process in which one or more components are at risk of damage due to thermal stresses induced by exposure of the components to a heat-containing medium. A such, it is further to be understood, that while many of the embodiments disclosed herein describe HRSGs in the context of combined cycle power generation plants, embodiments of the invention are also equally applicable to heat recovery generators (which may or may not involve steam) in applications other than combined cycle power generation plants.

Accordingly, referring to FIG. 1, a system 10 for heating one or more components 12, 14, 16, 18 of a HRSG 20 includes a flow path 22 defined by a housing 23 of the HRSG 20, and a heat-transferring conduit 24. The flow path 22 directs a heat-containing medium 26 to heat the one or more components 12, 14, 16, 18 and includes a high-pressure section 28 and a low-pressure section 30. The heat-transferring conduit 24 fluidly connects the high-pressure section 28 to the low-pressure section 30, and is configured to receive the heat-containing medium 24 from the flow path 22 such that the heat-containing medium 26 flows through the heat-transferring conduit 24 based at least in part on a pressure differential between a first pressure p1 of the heat-containing medium 26 at the high-pressure section 28 and a second pressure p2 of the heat-containing medium 26 at the low-pressure section 30. The heat-transferring conduit 24 directs the heat-containing medium 26 to heat the one or more components 12, 14, 16, 18.

In embodiments, the system 10 may further include the one or more components 12, 14, 16, 18, the heat recovery steam generator 20, and/or a controller 32. The controller 32 may include at least one processor/CPU 34 and a memory device 36 that stores a heating program/application. The controller 32 may be disposed in the HRSG 20 and/or otherwise located such that the controller 32 is in electronic communication with the various components, to include the one or more components 12, 14, 16, 18 of the system 10.

As shown in FIG. 1, the one or more components 12, 14, 16, 18 may be disposed in the HRSG 20 such that the one or more components 12, 14, 16, 18 define a working conduit 38 that contains a working medium 40. The one or more components 12, 14, 16, 18 may include tanks 18, evaporators 14, 16, and super heaters 12, and/or other components that receive/absorb heat originating from the heat-containing medium 26 and transfer the absorbed heat to the working medium 40. In embodiments, at least some of the one or more components 12, 14, 16 may be disposed in the flow path 22 and/or or otherwise configured to be in heating contact with the heat-containing medium 26. In certain embodiments, the one or more components to be heated may be located or situated exterior to the housing of the HRSG 20. Such exterior components may include drums, tanks or the like.

In embodiments, the one or more components 12, 14, 16, 18 may be/include one or more pressurized/pressurize/pressure parts 12, 14, 16, 18. As used herein, the terms "pressure part," "pressurize part," and "pressurized part" mean any component of the HRSG 20, or similar device, which contains a pressurized medium, e.g., steam, flue gas, and/or other pressurized mediums, to include the working medium 40 and/or the heat-containing medium 26. The pressurize parts 12, 14, 16, 18 may have thick walls. For example, in embodiments, the HRSG 20 may be a triple pressure HRSG in which the one or more components 12, 14, 16, 18 are grouped into a first 42, second 44, and third 46 pressure sections, the components grouped into each pressure section 42, 44, 46 being configured, e.g. having thicker walls, to contain the working medium 40 at a higher pressure than the previous sections. For example, as shown in FIG. 1, component 12 may be grouped into third pressure section 46 and configured to contain the working medium 40 at a higher pressure than pressure components 14 and 16, which may be grouped into the second 44 and first 42 pressure sections, respectively. Additionally, component 14 may be configured to contain the working medium 40 as a pressure higher than component 16. While FIG. 1 depicts the HRSG 20 as having three pressure sections 42, 44, and 46, it is to be understood that the HRSG 20 may have additional and/or fewer pressure sections.

Continuing, the flow path 22 includes an inlet 48 and an outlet 50 and is configured to heat the working medium 40 via the working conduit 38. For example, the flow path 22 may direct the heat-containing medium 26 to come into heating contact with the working conduit 38. In such embodiments, the flow path 22 may direct the heat-containing medium 26 so that the one or more components 12, 14, 16 are directly exposed to the heat-containing medium 26. As can be seen in FIG. 1, the high-pressure section 28 may be a section of the flow path 22 upstream of the one or more components 12, 14, 16 and the low-pressure section 30 may be a section of the flow path 22 that is downstream of the one or more components 12, 14, 16.

The working conduit 38 is configured to absorb heat from the heat-containing medium 26 that is directed by the flow path 22. For example, as can be seen in FIG. 1, at least part of the working conduit 38 may be disposed in the flow path 22 such that the exterior of the working conduit 38 is directly exposed to the heat-containing medium 26. The thermal energy absorbed from the heat-containing medium 26 by the working conduit 38 is then transferred to the working medium 40, which increases in temperature and/or pressure. In embodiments, the working medium 40 is heated until it changes from a liquid to a gas and/or plasma. In embodiments, the working conduit 38 may include valves 52 and 54 that regulate the flow of the working medium 40 to and/or from the working conduit 38.

The heat-transferring conduit 24 includes an extraction port 56, e.g. an inlet, and an exhaust port 58, e.g., an outlet. The extraction port 56 may fluidly connect the heat-transferring conduit 24 to the high-pressure section 28 of the flow path 22, and the exhaust port 58 may fluidly connect the heat-transferring conduit 24 to the low-pressure section 30 of the flow path 22. As stated above, the heat-transferring conduit 24 is configured to receive the heat-containing medium 26 from the flow path 22. A valve 60 may be disposed in the heat-transferring conduit 24. The valve 60 may be configured to regulate the amount of heat-containing medium 26 that flows into the heat-transferring conduit 24 from the flow path 22. For example, the valve 60 may regulate the velocity-head of the heat-containing medium 26 that enters the heat-transferring conduit 24. As is to be appreciated, regulating/controlling the amount of heat-containing medium 26 that flows through the heat-transferring conduit 24 may in turn regulate/control the temperature of the one or more components 12, 14, 16, 18.

As stated above, the heat-transferring conduit 24 directs the heat-containing medium 26 to heat the one or more components 12, 14, 16, 18. Accordingly, in embodiments, the heat-transferring conduit 24 may be in heating contact with the one or more components 12, 14, 16, 18 and/or otherwise direct the heat-containing medium 26 to be in heating contact with the one or more components 12, 14, 16, 18. In particular, and as shown in FIG. 1, the heat-transferring conduit 24 may wrap around the one or more components 12, 14, 16, 18, individually and/or collectively. In embodiments, the heat-transferring conduit 24 may be used to heat-trace the one or more components 12, 14, 16, 18.

Figure 2:
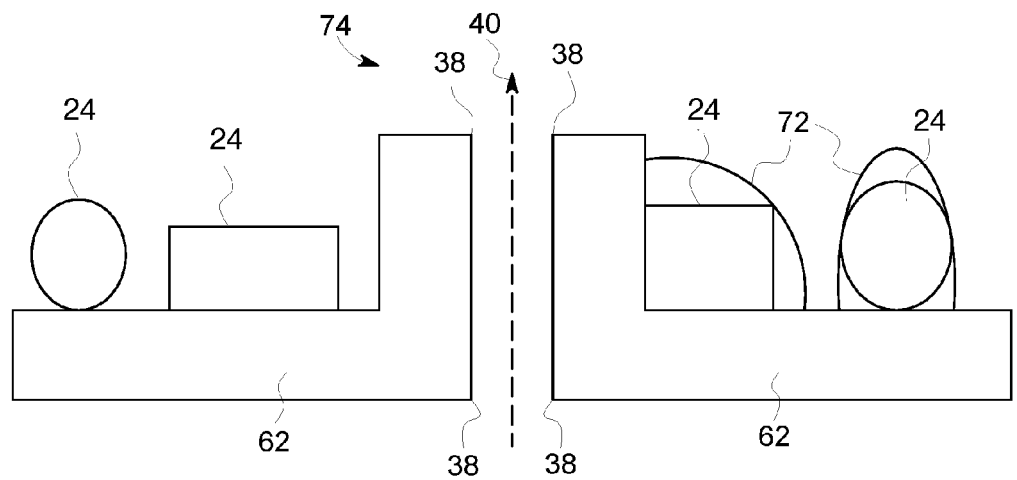
FIG. 2 is a cross-sectional diagram of the heat-transferring conduit and a component of the one or more components of FIG. 1.

For example, turning now to FIG. 2, a cross-section of a component 62, representative of the one or more components 12, 14, 16, 18 that form the working conduit 38 which contains the working medium 40, is shown in heating contact with the heat-transferring conduit 24. As is to be appreciated, the heat-transferring conduit 24 may have one or more segments having a circular, rectangular, and/or square cross section/exterior surface. As further shown in FIG. 2, the heat-transferring conduit 24 may be attached to the component 62, via fasteners 72, e.g., welds, adhesives, screws, nuts, bolts, and/or any other means for attaching and/or securing the heat-transferring conduit 24 to the component 62.

Referring now to FIG. 3, the heat-transferring conduit 24 may wrap around the component 62 in a spiral pattern as shown by the stenciled segments of the heat-transferring conduit 24, which represent the portions of the heat-transferring conduit 24 that are behind the depicted component 62. While FIG. 3 shows the heat-transferring conduit 24 tracing the component 62 with a spiral pattern, it is to be understood that other patterns may be used. Additionally, as shown in both FIGS. 2 and 3, the heat-transferring conduit 24 may be placed in heating contact with the component 62 near a nozzle 74 of the working conduit 38 formed by the component 62.

Turning now to FIG. 4, in embodiments, the heat-containing medium 26 may be a flue gas produced/generated by a combustion chamber 76. In embodiments, the combustion chamber 76 may produce the heat-containing medium 26 via combusting a fuel. It is to be understood, however, that the combustion chamber 76 may produce the heat-containing medium 26 by other chemical processes, e.g., electrolysis and/or other chemical means of producing a heated gas. In embodiments, the combustion chamber 76 may provide heat for a process, e.g., power generation, substance conditioning, and/or other industrial, medical and/or domestic applications, in addition to providing the heat-containing medium 26. In such embodiments, the heat-containing medium 26 may be a waste gas.

As illustrated in FIG. 4, the HRSG 20 may be a secondary generator of a combined cycle power generation plant 78. In such embodiments, the combustion chamber 76 may produce heat and/or power for a primary generator 80 of the combined cycle power generation plant 78, e.g., the combustion chamber 76 and primary generator 80 may be a gas-fired turbine that generates electrical power, and the HRSG 20 may be configured to increase the overall efficiency of the combined cycle power generation plant 78 by capturing/recovering some and/or most of the thermal-energy in the flue gas 26 produced by the gas-fired turbine 76, 80.

In embodiments, the combined cycle power generation plant 78 may operate in two modes: simple cycle mode; and combined cycle mode. In combined cycle mode, the HRSG 20 is "online" such that the heat-containing medium 26 produced by the combustion chamber 76 is fed via inlet/duct 48 into the flow path 22 of the HRSG 20 which recovers, via the one or more components 12, 14, 16, 18, some and/or most of the thermal energy contained in the heat-containing medium 26. In simple cycle mode, the HRSG 20 is "offline"

and does not recover thermal energy, via the one or more components 12, 14, 16, 18, from the heat-containing medium 26.

In such embodiments, when the combined cycle power generation plant 78 is in simple cycle mode, however, the heat-containing medium 26 may be diverted away from the one or more components 12, 14, 16, 18 of the HRSG 20 so that the one or more components 12, 14, 16, 18 are not exposed to the heat-containing medium. For example, in simple cycle mode, the heat-containing medium 26 may follow dashed line/path 82, as opposed to solid line/path 84, as shown in FIG. 4; and in combined cycle mode, the heat-containing medium 26 may follow the solid line/path 84, as opposed to the dashed line/path 82, as also shown in FIG. 4. In such embodiments, the combined cycle power generation plant 78 may include a bypass stack 86 that allows the heat-containing medium 26 to bypass, i.e., flow around, the HRSG 20. In embodiments where the combined cycle power generation plant 78 has a bypass stack 86, one or more valves 88, 90 may alter/control/regulate the flow of the heat-containing medium 26 between the HRSG 20 and the bypass stack 86. As is to be appreciated, the valves 88, 90 may be variable, i.e., the amount of heat-containing medium 26 diverted into the bypass stack 86 versus the amount of heat-containing medium 26 sent to the HRSG 20 may be varied, and/or digital, i.e., valves 88, 90 may only direct all of the heat-containing medium 26 to either the bypass stack 86 or to the HRSG 20.

Accordingly, referring to FIGS. 1 and 4, in operation in accordance with an embodiment, the combine-cycle-power-generation plant 78 may begin operating in simple cycle mode with the HRSG 20 offline such that the heat-containing medium 26 is directed by the valves 88, 90 to the bypass stack 86, resulting in the one or more components 12, 14, 16, 18 of the HRSG 20 not being in heating contact with the heat-containing medium 26 via the flow path 22. As such, the one or more components 12, 14, 16, 18 may be at and/or cool down to near ambient temperature.

The combine-cycle-power-generation plant 78 may then begin transitioning to combined cycle mode by directing, via the values 88, 90, some and/or all of the heat-containing medium 26 to the inlet 48 of the flow path 22. In turn, the flow path 22 directs the heat-containing medium 26 such that the one or more components 12, 14, 16, 18, and/or the working conduit 38 formed/defined by the one or more components 12, 14, 16, 18, are in heating contact with the heat-containing medium 26, e.g., the one or more components are exposed to the heat-containing medium 26. At such time, however, the working medium 40 may be restricted by valves 52 and/or 54 from flowing into the working conduit 38. Thus, the one or more components 12, 14, 16 may begin to absorb thermal energy from the heat-containing medium 26, i.e., rise in temperature, without converting the working medium 40 into steam. Restricting the working medium 40 from flowing into the working conduit 38 while the heat-containing medium 26 heats the one or more components 12, 14, 16 reduces the thermal stresses induced in the one or more components 12, 14, 16.

As the one or more components 12, 14, 16 absorb thermal energy from the heat-containing medium 26, the pressure of the heat-containing medium 26 decreases. Thus, the pressure p1 of the heat-containing medium 26 at the high-pressure section 28 may be greater than the pressure p2 of the heat-containing medium 26 at the low-pressure section 30. The pressure differential between the pressure p1 and the pressure p2 results in some of the heat-containing medium 26 entering the heat-transferring conduit 24 via the extraction port 56. As heat-containing medium 26 flows through the heat-transferring conduit 24, the one or more components 12, 14, 16 are further heated by the heat-containing medium 26.

Additionally, in embodiments, the heat-transferring conduit 24 may direct the heat-containing medium 26 to heat components 18 that form part of the working conduit 38 that may not be heated/exposed to the heat-containing medium 26, via the flow path 22, when the working medium 40 is restricted from flowing into the working conduit 38, i.e., pressurized components 18 that are outside of the flow path 22 and not normally heated until placed in heating contact with the heated working-fluid 40, e.g., steam. In such embodiments, the heat-transferring conduit 24 provides for the evening of the temperature gradient across the working conduit 38 prior to the HRSG 20 converting the working medium 40 into steam. Evening out the temperature gradient of the working conduit 38, prior to HRSG 20 steam generation, reduces the thermal stresses induced in the one or more components 18 that otherwise would have been first heated by heated working medium 40, e.g., steam. In embodiments, the temperature and/or rate of temperature flux, i.e., rate of temperature change, of the one or more components 12, 14, 16, 18 may be regulated/controlled by regulating/controlling the amount of heat-containing medium 26 that flows through the heat-transferring conduit 24 via valve 60.

As it to be appreciated, heating the one or more components 12, 14, 16, 18 with the heat-transferring conduit 24, as described above, reduces the temperature difference between the one or more components 12, 14, 16, 18 and the heated working medium 40 such that the amount and/or magnitude of thermal stress induced in the one or more components 12, 14, 16, 18 by exposure to the working medium 40 is reduced.

Once the one or more components 12, 14, 16, 18 have reached a temperature sufficient to reduce the amount of thermal stress induced in the one or more components 12, 14, 16, 18 by exposure to the working medium 40, e.g., steam production, valves 52 and/or 54 may allow the working medium 40 to flow into the working conduit 38 which then converts the working medium 40 into steam by absorbing/transferring heat from the heat-containing medium 26 to the working medium 40. As shown by arrow 92 in FIG. 1, the steam, i.e., heated working medium 40, generated by the HRSG 20 may be sent to a steam consuming device and/or process, e.g., a steam turbine power generator.

Thus, as described above, the system 10 may be used to preheat and/or more uniformly heat the components 12, 14, 16 and 18 via the heat-transferring conduit 24, which in turn alleviates the thermal stresses therein. As used herein, the term "preheat" means the heating of one or more components of an HRSG before the one or more components are exposed to a sustained normal operating load of the heat-containing medium, e.g., before the HRSG is generating steam at levels consistent with "full load" operations. As used herein, the term "uniform heating" means the heating of one or more HRSG components 12, 14, 16 and 18 from both the outside (via system 10) and the inside (via heated fluid 40) before the components 12, 14, 16 and 18 are exposed to a sustained normal operating load of the heat-containing medium, e.g., before the HRSG is generating steam at levels consistent with "full load" operations. It is to be understood, however, that in embodiments, the system 10 may be used to regulate, via the heat-transferring conduit 24, the temperature gradient across the working conduit 38 during combined cycle operations.

As is to be appreciated, in embodiments, one or more dampers (not shown) may be disposed in the flow path 22 downstream of the extraction port 56 and upstream of the pressurize parts 12, 14, 16, and 18 such that the dampers direct the heat containing medium/flue gas 26 to the bypass stack 86 until the flue gas 26 has heated the one or more pressurize parts 12, 14, 16, and 18 via the heat-transferring conduit 24.

Additionally, the heat-transferring conduit 24 may be further fluidly connected to a coolant source (FIG. 1, 94) that provides a coolant that cools the one or more components 12, 14, 16, 18 by flowing through the heat-transferring conduit 24. Cooling the one or more components 12, 14, 16, 18 via the coolant may regulate the temperature of the working medium 40 as it flows through the one or more components 12, 14, 16, 18. The flow of coolant from the coolant source 94 may be controlled/regulated by a valve 96.

It is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system 10 may include at least one processor 34, and system memory 36, which may include random access memory (RAM) and read-only memory (ROM). The system 10 may further include an input/output controller, and one or more data storage structures. All of these latter elements may be in communication with the at least one processor 34 to facilitate the operation of the system 10 as discussed above. Suitable computer program code may be provided for executing numerous functions, including those discussed above in connection with the system 10 and methods disclosed herein. The computer program code may also include program elements such as an operating system, a database management system and "device drivers" that allow the system 10, to interface with computer peripheral devices, e.g., sensors, a video display, a keyboard, a computer mouse, etc.

The at least one processor 34 of the system 10 may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link there-between.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the system 10 and/or one or more programs, e.g., computer program code such as the heating application and/or other computer program product, adapted to direct the system 10. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, includes one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor 34 of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for heating one or more components of a heat recovery steam generator is provided. The system includes a heat-transferring conduit that fluidly connects a high-pressure section of a flow path to a low-pressure section of the flow path. The flow path is defined by a housing of the heat recovery steam generator and configured to direct a heat-containing medium. The heat-transferring conduit is configured to receive the heat-containing medium from the flow path such that the heat-containing medium flows through the heat-transferring conduit via a pressure differential between the high-pressure section and the low-pressure section. The heat-transferring conduit is further configured to heat the one or more components of the heat recovery steam generator via directing the heat-containing medium to be in heating contact with the one or more components. The components may be exterior to the housing of the heat recovery steam generator. In certain embodiments, the one or more components define a working conduit containing a working medium, the flow path is configured to heat the working medium by directing the heat-containing medium to be in heating contact with the working conduit, and the heat-transferring conduit is further configured to uniformly heat the working conduit before the working medium is heated by the flow path. In certain embodiments, the one or more components define a working conduit configured to contain a working medium, the flow path is configured to heat the working medium via directing the heat-containing medium to be in heating contact with the working conduit, and the heat-transferring conduit is further configured to preheat the working conduit before the working medium is heated by the flow path. In certain embodiments, the high-pressure section is upstream of the low-pressure section. In certain embodiments, the heat-transferring conduit fluidly connects to the high-pressure section and the low-pressure section at an extraction port and an exhaust port, respectively, and at least some of the one or more components are disposed in the flow path between the extraction port and the exhaust port. In certain embodiments, the system further includes a valve disposed in the heat-transferring conduit and configured to regulate the temperature of the one or more components by controlling an amount of the heat-containing medium that flows through the heat-transferring conduit. In certain embodiments, the heat-transferring conduit has at least one segment having a circular or rectangular shape. In certain embodiments, the heat-transferring conduit is further fluidly connected to a coolant source that provides a coolant that cools the one or more components via flowing through the heat-transferring conduit. In certain embodiments, the one or more components are pressurize parts. In certain embodiments, the heat-containing medium is a flue gas produced by a combustion chamber. In certain embodiments, the heat recovery steam generator is a secondary generator in a combined cycle power generation plant, and the combustion chamber provides power for a primary generator of the combined cycle power generation plant.

Other embodiments provide for a method for heating one or more components of a heat recovery steam generator. The method includes directing a heat-containing medium via a flow path defined by a housing of the heat recovery steam generator. The flow path including a high-pressure section and a low-pressure section. The method further includes receiving the heat-containing medium via a heat-transferring conduit fluidly connected to the high-pressure section and the low-pressure section. The method further includes heating the one or more components of the heat recovery steam generator by directing, via the heat-transferring conduit, the heat-containing medium to be in heating contact with the one or more components. The heat-containing medium flows through the heat-transferring conduit based at least in part on a pressure differential between the high-pressure section and the low-pressure section. In certain embodiments, heating the one or more components of the heat recovery steam generator by directing, via the heat-transferring conduit, the heat-containing medium to be in heating contact with the one or more components, preheats a working conduit defined by the one or more components and configured to contain a working medium. In certain embodiments, heating the one or more components of the heat recovery steam generator by directing, via the heat-transferring conduit, the heat-containing medium to be in heating contact with the one or more components uniformly heats a working conduit defined by the one or more components and configured to contain a working medium. In certain embodiments, the method further includes regulating, via a valve disposed in the heat-transferring conduit, the temperature of the one or more components by controlling an amount of the heat-containing medium that flows through the heat-transferring conduit. In certain embodiments, the method further includes cooling the one or more components via a coolant provided by a coolant source fluidly connected to the heat-transferring conduit such that the coolant flows through the heat-transferring conduit. In certain embodiments, the one or more components are pressurize parts. In certain embodiments, the heat-containing medium is a flue gas produced by a combustion chamber. In certain embodiments, the heat recovery steam generator is a secondary generator in a combined cycle power generation plant, the combustion chamber provides power for a primary generator of the combined cycle power generation plant, the combined cycle power generation plant transitions between a simple cycle mode and a combined cycle mode, and the heat-transferring conduit preheats the one or more components before the combined cycle power generation plant finishes transitioning from the simple cycle mode to the combined cycle mode.

Yet still other embodiments provide for a heat recovery steam generator for recovering heat from a flue gas produced by a combustion chamber. The heat recovery steam generator includes one or more pressurized parts, a flow path, and a heat-transferring conduit. The one or more pressurize parts define a working conduit configured to contain a working medium. The flow path is defined by a housing of the heat recovery steam generator, includes a high-pressure section and a low-pressure section, and is configured to direct the flue gas. The heat-transferring conduit fluidly connects the high-pressure section to the low-pressure section and is configured to receive the flue gas from the flow path such that the flue gas flows through the heat-transferring conduit based at least in part on a pressure differential between a first pressure of the flue gas at the high-pressure section and a second pressure of the flue gas at the low-pressure section. The heat-transferring conduit is further configured to direct the flue gas to heat the one or more pressurized parts. In certain embodiments, the working conduit contains a valve that restricts the working medium from flowing into the working conduit until after the flue gas heats the one or more pressurize parts via the heat-transferring conduit. In certain embodiments, one or more dampers are disposed in the flow path and configured to direct the flue gas to a bypass stack until the flue gas has heated the one or more pressurize parts via the heat-transferring conduit.

Accordingly, as is to be appreciated, by heating, via the heat-transferring conduit 24, the one or more components 12, 14, 16, 18 prior to steam production in the HRSG 20, some embodiments of the system 10 decrease the amount of time needed to heat the one or more components 12, 14, 16, 18 of the HRSG 20, thus providing for a decrease in the amount of time required to start up the HRSG 20. Moreover, by preheating and/or uniformly heating the one or more components 12, 14, 16, 18 prior to and/or concurrently with the introduction of working medium 40 into the working conduit 38, some embodiments of the system 10 provide for the working medium 40 to be at a relatively high temperature, i.e., at and/or near the normal/full load temperature of the heat-containing medium 26 during combined cycle operations, when the heat-containing medium first comes into contact with the one or more components 12, 14, 16, 18.

By preheating and/or uniformly heating the one or more components 12, 14, 16, and 18, some embodiments of the system 10 reduce the amount of thermal stresses induced in the one or more components 12, 14, 16, 18 resulting from introduction of the working medium 40 into the working conduit 38, which in turn increases the expected services lives of the one or more components 12, 14, 16, and 18. Further, by using the pressure differential between the high-pressure section 28 and the low-pressure section 30 to power the flow of heat-containing medium 26 into and through the heat-transferring conduit 24, some embodiments of the system 10 provide for preheating, and/or temperature regulation, of the one or more components 12, 14, 16, 18 without the use of an auxiliary heat source, e.g., an auxiliary boiler, and/or electric heat tracing.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for heating one or more components of a heat recovery steam generator, the system comprising:
   a heat-transferring conduit that fluidly connects a first section of a flow path having a first pressure to a second section of the flow path having a second pressure, the flow path defined by a housing of the heat recovery steam generator to direct a heat-containing medium through the heat recovery steam generator;
   wherein the first pressure is greater than the second pressure such that a portion of the heat-containing medium flows through the heat-transferring conduit from the first section to the second section of the flow path via a pressure differential between the first section and the second section; and
   wherein the heat-transferring conduit is disposed external of the housing and in thermal engagement with a component of the heat recovery steam generator disposed external of the housing to heat said component.

2. The system of claim 1, wherein the component defines a working conduit containing a working medium,
   the heat-transferring conduit is further configured to preheat the working conduit before the working medium is heated by the heat-containing medium passing through the flow path.

3. The system of claim 1, wherein the one or more components define a working conduit containing a working medium,
   the heat-transferring conduit is further configured to uniformly heat the working conduit before the working medium is heated by the heat-containing medium passing through the flow path.

4. The system of claim 1, wherein first section is an extraction port of the heat recovery steam generator and the second section is an-exhaust port of the heat recovery steam generator.

5. The system of claim 1, further comprising a valve disposed in the heat-transferring conduit and configured to regulate the temperature transferred to component by controlling an amount of the heat-containing medium that flows through the heat-transferring conduit.

6. The system of claim 1, further comprising a coolant source fluidly connected to the heat-transferring conduit to provide a coolant that cools the component via flowing through the heat-transferring conduit.

7. The system of claim 1, wherein the component is a pressurize part.

8. The system of claim 1, wherein the heat-containing medium is a flue gas produced by a combustion chamber.

9. The system of claim 8, wherein the heat recovery steam generator is a secondary generator in a combined cycle power generation plant, and the combustion chamber provides power for a primary generator of the combined cycle power generation plant.

10. A method for heating one or more components of a heat recovery steam generator, the method comprising:
   directing a heat-containing medium via a flow path defined by a housing of the heat recovery steam generator, the flow path including a first section having a first pressure and a second section having a second pressure, the first pressure being greater than the second pressure;
   receiving a portion of the heat-containing medium via a heat-transferring conduit disposed external of the housing and fluidly connected to the first section and the second section;
   heating a component of the heat recovery steam generator disposed external of the housing by directing, via the heat-transferring conduit, the heat-containing medium to be in heating contact with the component; and
   wherein the heat-containing medium flows through the heat-transferring conduit based at least in part on a pressure differential between the first pressure of the first pressure section and the second pressure of the second section.

11. The method of claim 10, wherein the heating the component includes preheating a working conduit defined by the component and configured to contain a working medium.

12. The method of claim 11, the method further comprising:
   regulating, via a valve disposed in the heat-transferring conduit, the temperature of the component by controlling an amount of the heat-containing medium that flows through the heat-transferring conduit.

13. The method of claim 10, wherein the heating the component of the heat recovery steam generator includes uniformly heating a working conduit defined by the component and configured to contain a working medium.

14. The method of claim 10, the method further comprising:
   cooling the component via a coolant provided by a coolant source fluidly connected to the heat-transferring conduit such that the coolant flows through the heat-transferring conduit.

15. The method of claim 10, wherein the heat-containing medium is a flue gas produced by a combustion chamber.

16. The method of claim 15, wherein
   the heat recovery steam generator is a secondary generator in a combined cycle power generation plant,
   the combustion chamber provides power for a primary generator of the combined cycle power generation plant,
   the combined cycle power generation plant transitions between a simple cycle mode and a combined cycle mode, and
   the heat-transferring conduit preheats the component before the combined cycle power generation plant finishes transitioning from the simple cycle mode to the combined cycle mode.

17. A heat recovery steam generator for recovering heat from a flue gas produced by a combustion chamber, the heat recovery steam generator comprising:
   a pressurize part disposed external to the housing and defining a working conduit configured to contain a working medium;
   a flow path defined by a housing of the heat recovery steam generator and configured to direct the flue gas, the flow path including a first section having a first pressure and second section having a second pressure, the first pressure is greater than the second pressure;
   a heat-transferring conduit fluidly connecting the first section to the second section and configured to receive a portion of the flue gas from the flow path such that the flue gas flows through the heat-transferring conduit based at least in part on a pressure differential between the first pressure of the first section and a second pressure of the second section; and
   wherein the heat-transferring conduit is disposed external to the housing and further configured to direct the portion of the flue gas from the first section to the second section to heat the pressurize part.

18. The heat recovery steam generator of claim 17, wherein the working conduit contains a valve that restricts the working medium from flowing into the working conduit until after the portion of the flue gas heats the pressurize part via the heat-transferring conduit.

19. The heat recovery steam generator of claim 17, wherein a damper is disposed in the flow path and configured to direct the flue gas to a bypass stack until the flue gas has heated the part via the heat-transferring conduit.

20. The system of claim 1, wherein the heat-transferring conduit is wrapped around the component.

* * * * *